(12) United States Patent
Schloss

(10) Patent No.: US 8,506,824 B1
(45) Date of Patent: Aug. 13, 2013

(54) METHOD FOR SEPARATING PUTRESCIBLE ORGANIC MATTER FROM INORGANIC GRIT SUSPENDED IN WASTE WATER AND SEWAGE

(76) Inventor: Charles M. Schloss, Aurora, CO (US)

( * ) Notice: Subject to any disclaimer, the term of this patent is extended or adjusted under 35 U.S.C. 154(b) by 0 days.

(21) Appl. No.: 13/472,800

(22) Filed: May 16, 2012

(51) Int. Cl.
*B01D 21/26* (2006.01)
*B04C 5/18* (2006.01)
*C02F 1/38* (2006.01)

(52) U.S. Cl.
USPC ........ 210/788; 210/787; 210/512.1; 210/772; 210/801; 210/803; 209/731; 209/716; 209/730

(58) Field of Classification Search
USPC .................. 210/787, 788, 512.1, 512.2, 764, 210/768, 772, 789, 799, 800, 801, 803, 258, 210/416.1, 528, 523, 526, 538, 540, 519; 209/716, 720, 721, 725, 724, 730, 727, 731, 209/717, 719
See application file for complete search history.

(56) References Cited

U.S. PATENT DOCUMENTS

| | | | | |
|---|---|---|---|---|
| 1,493,186 A | * | 5/1924 | Bentham | 406/34 |
| 2,590,691 A | * | 3/1952 | Fontein | 209/173 |
| 2,817,441 A | * | 12/1957 | Leeman et al. | 209/727 |
| 3,130,157 A | * | 4/1964 | Kelsall et al. | 210/512.1 |
| 3,337,050 A | * | 8/1967 | Labecki | 209/731 |
| 3,347,372 A | * | 10/1967 | Bouchillon | 209/731 |
| 3,754,655 A | * | 8/1973 | Troland | 210/209 |
| 4,151,083 A | * | 4/1979 | Dove | 162/55 |
| 4,214,887 A | * | 7/1980 | van Gelder | 71/9 |
| 4,364,822 A | * | 12/1982 | Rich, Jr. | 209/3 |
| 4,399,027 A | * | 8/1983 | Miller | 209/164 |
| 4,818,400 A | * | 4/1989 | Russell et al. | 210/262 |
| 7,028,848 B2 | * | 4/2006 | Bozzato | 209/724 |
| 7,214,323 B2 | * | 5/2007 | Pullman | 210/780 |
| 2006/0243646 A1 | * | 11/2006 | Kucher et al. | 209/730 |

* cited by examiner

*Primary Examiner* — David C Mellon
(74) *Attorney, Agent, or Firm* — Edwin H. Crabtree; Ramon L. Pizarro

(57) ABSTRACT

A method for treating waste water and sewage by introducing high pressure wash water or other fluids including gas into a housing of a hydro-cyclone and creating a cyclone with an enhanced and controllable vortex for increased removal of putrescible materials. Waste water and sewage is introduced into the housing and into the cyclone vortex. By the very high centrifugal force generated, suspended inorganic grit is quickly separated from the wash water and organic matter. The water with organic matter is then discharged typically out of the top of the housing, for returning to a water treatment plant for further processing. At this time, the separated inorganic grit, as a concentrated grit liquid, is typically funneled downwardly by gravity through a bottom of the hydro-cyclone housing for waste discharge removal.

16 Claims, 1 Drawing Sheet

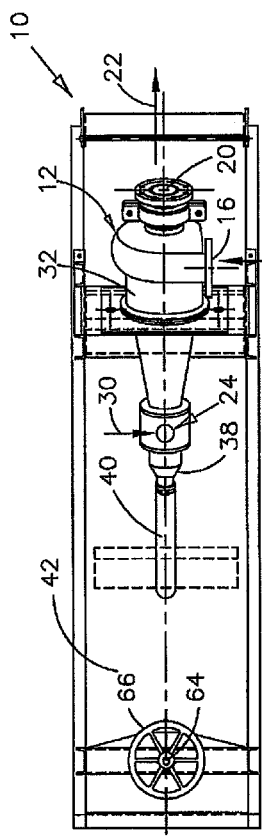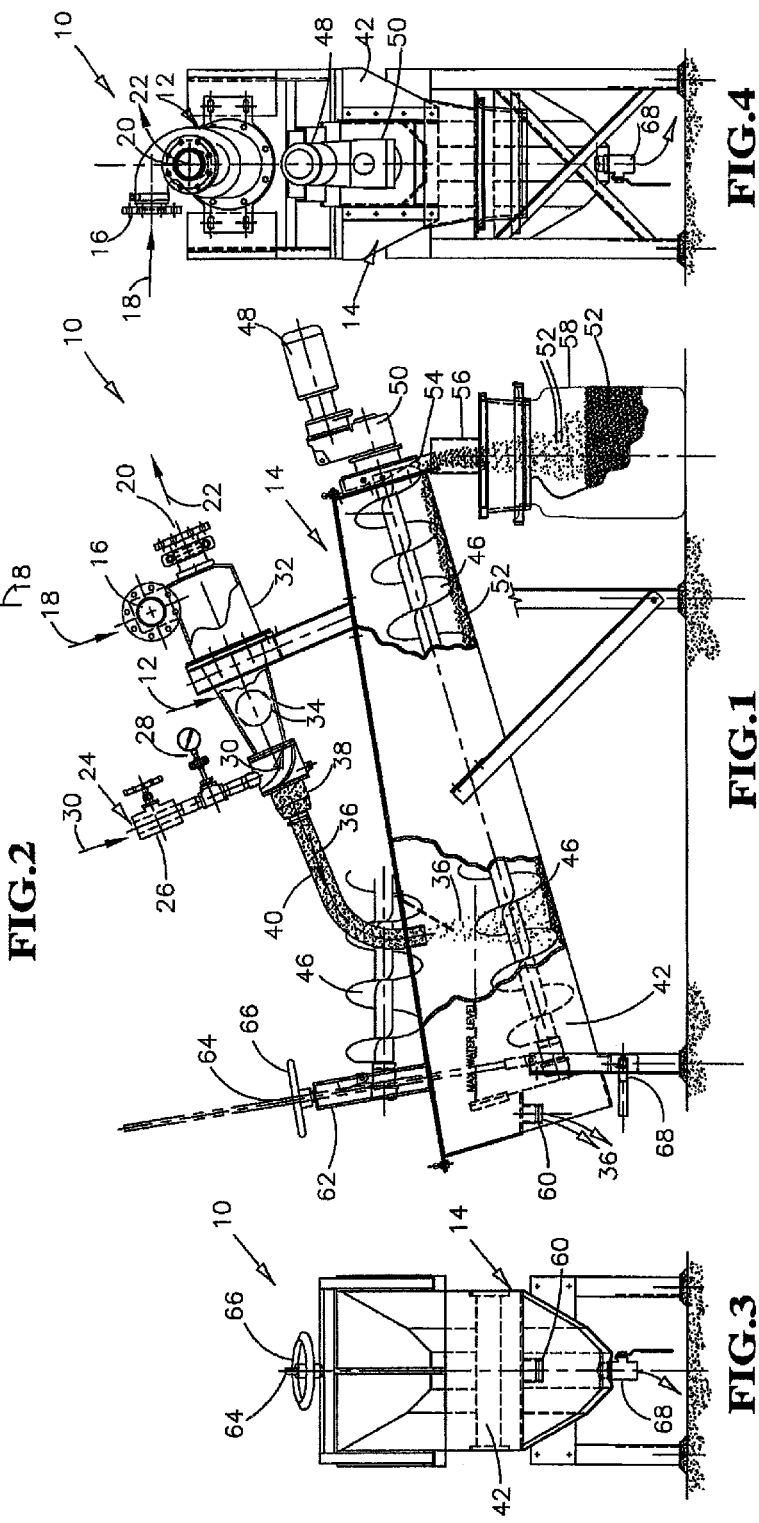

METHOD FOR SEPARATING PUTRESCIBLE ORGANIC MATTER FROM INORGANIC GRIT SUSPENDED IN WASTE WATER AND SEWAGE

BACKGROUND OF THE INVENTION (a) Field of the Invention

This invention relates to a method of treating waste water and sewage and more particularly, but not by way of limitation, to a method for enhanced removal of putrescible organic matter, such as fecal waste, grease, oil, bacteria and slime, from inorganic grit, such as sand, gravel, concrete particles, and like material found in waste water and sewer water.

(b) Discussion of Prior Art

In the modern remediation of waste water and sewage, a fluid is first screened to remove paper, plastic, rags and the like. Secondarily, the fluid is then treated for removing inorganic grit material from the organic material suspended therein. The de-gritted fluid is then transferred to a tank or a holding pond to allow the organic waste material to settle to a bottom of the tank or the pond. Later, the material is removed as sludge for further processing or taken to a land fill.

Heretofore, there have been a number of systems for removing grit from a sewage flow. For example, a typical grit collector system includes a dewatering device such as an inclined screw conveyor mounted in a tank. This type of device is called a classifier, screw classifier, grit washer, or dewatering conveyor. While modern classifiers are successful in removing much of the putrescible organic material in the waste water and preventing it from going to a landfill, these units are complex in design, expensive and fail to capture smaller inorganic grit particles suspended in the liquid. Therefore, the fine grit remains in the treated waste water and returns to a water treatment plant for further processing, where it plugs up digesters, wears out pumps and water treatment equipment and causes ongoing maintenance and operational problems. The subject method greatly reduces the above mentioned fine grit maintenance problems and with reduced operation costs, while enhancing the capture of fine putrscisble material for return to a treatment plant for further treatment and/or disposal while decreasing the putrescible material going to the landfill.

In U.S. Pat. No. 3,130,157 to Kelsall et al., a hydro-cyclone is disclosed and used for the classification of metallurgical pulps or ore concentrates from a mining operation. The object of the hydro-cyclone is to improve the efficiency of classification by decreasing the proportion of fine particles in the underflow pulp using an increased cyclonic action to wash fine particles from between voids in the large suspended particles. This type of fluid cyclone unit, while widely used in the mining industry, has not been used in conjunction with a method for treating waste water and sewage with the following unique features, objects and advantages as discussed herein.

SUMMARY OF THE INVENTION

In view of the foregoing, it is a primary objective of the subject invention to provide an efficient and cost effective method for treating waste water and sewage and reducing the putrescible organic contamination of the removed grit while removing inorganic fine grit suspended in the liquid and returning the putrescible organic matter in solution to a water treatment plant for further processing and/or disposal.

Another object of the invention is the method can be used in conjunction with a screw classifier, a belt dewatering conveyor, a dewatering screen, a drain tank, depositing the inorganic matter on a floor surface, or other means.

Yet another object of the invention is by removing most or all of the suspended inorganic grit in the waste water, maintenance and equipment problems are reduced during plant operations.

Still another object of the invention is because of the simplicity and efficiency of the water treatment method, the capital expense and maintenance expense of the system, using the subject method, is reduced when compared to more expensive and complex waste water treatment systems.

The subject method for treating waste water and sewage, broadly includes introducing high pressure wash water or a gas through a wash water inlet in a housing of a hydro-cyclone and creating a high velocity water or gas spin therein, in a form of a vortex. Waste water and sewage is introduced through a waste water inlet and then into the cyclone in which the water spin creates a vortex within the cyclone. By the very high centrifugal force generated, the suspended inorganic grit is quickly separated from the wash water and organic matter. The water with putrescible organic matter is now discharged out a treated water outlet for returning to a water treatment plant for further processing. At this time, the separated inorganic grit, as a concentrated grit liquid, is funneled downwardly by gravity past the waste water inlet for further dilution and washing, then down through a lower apex in the bottom of the hydro-cyclone housing, and into an open top of a screw classifier, as shown in the drawings.

As mentioned above, the subject method of treating waste water and sewage using the hydro-cyclone can be used equally well with a belt dewatering conveyor, a dewatering screen, a drain tank, other devices, or depositing the waste on a floor surface, rather than the screw classifier.

These and other objects of the present invention will become apparent to those familiar with different types of treating waste water and sewage and using related equipment when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject method for treating waste water and sewage, and in which:

FIG. 1 is a side view of a waste water system for practicing the subject method and illustrating a hydro-cyclone with housing mounted on top of a screw classifier. A portion of the hydro-cyclone housing has been cut-away and a portion of a side of a screw classifier housing has been cut-away for illustrating the flow of the waste water, as it's being treated.

FIG. 2 is a top view of the waste water system.

FIGS. 3 and 4 are opposite end views of the waste water system.

DETAILED DESCRIPTION OF THE PREFERRED EMBODIMENTS

In FIG. 1, a waste water system is shown having general reference numeral 10 and used for practicing the subject method as described for treating waste water and sewage. The waste water system 10, for receiving waste water and sewage, broadly includes a hydro-cyclone assembly, having general reference numeral 12 mounted upstream and on top of a screw classifier, having general reference numeral 14. Again, the screw classifier 14 is shown as an example only and it can be appreciated that there is other types of equipment that can be used equally well for collecting the inorganic grit from the hydro-cyclone assembly 12.

The hydro-cyclone assembly 12 includes, at its upper end, a waste water inlet 16 for receiving waste water and sewage, indicated by arrow 18. Also, at the upper end is a treated water outlet 20 for returning treated water, as indicated by arrow 22, to a water treatment plant. The hydro-cyclone assembly 12 is characterized by having a wash water inlet 24, with control valve 26 and water pressure gauge 28, for injecting high pressure wash water tangentially, as indicated by arrow 30, into a downstream side of a cyclone housing 32. As the high pressure wash water 30 enters the housing 32, it creates an action enhancing vortex for removing fine putrescible materials from the flow. As the waste water 18 moves downwardly inside the housing 32, it moves into the vortex of the cyclone, thus creating a high velocity water spin, indicated by arrows 34, shown in a cut-away portion of the housing.

The high velocity water spin 34, by centrifugal force, removes the fine inorganic grit suspended in the waste water 18, shown as small dots in the drawing, from the putrescible organic matter entrained in the waste water. At this time, the separated inorganic grit, as a concentrated grit liquid, indicated by arrows 36, is funneled downwardly under pressure and gravity through a lower apex 38 of the bottom of the cyclone housing 32 and through a cyclone discharge hose 40 or other means. In this drawing and for example, the grit liquid 36 is deposited into an open top housing 42 of the screw classifier 14.

Also at this time, the combination of the wash water and the putrescible organic waste or overflow, with the fine grit removed, is discharged upwardly, as indicated by arrow 22, through the treated water outlet 20 to be returned to the water treatment plant for further filtering, cleaning, and chlorination and/or disposal.

The screw classifier 14, as an example, is shown in this drawing with a portion of a side of the open top housing 42 cut-away to illustrate a screw conveyor 46 mounted therein and driven by a drive motor 48 with speed reducer 50 mounted on an upper end of the classifier housing 42. As the concentrated liquid 36 is discharged into the classifier 14, the inorganic grit begins to settle to the bottom of the housing 42. At the same time, the screw conveyor 46 moves the grit, shown as settled solids 52, upwardly to a discharge outlet 54. The settled solids 52 are dropped into a chute 56 and then into a top of a receptacle 58. A portion of the receptacle 58 has been cut-away to illustrate the settled solids 52 gathered in the bottom of the bin. The settled solids 52 in the bin 58 can be shipped to a landfill for disposal.

As the settled solids 52 are moved upwardly in the housing 42 by the screw conveyor 46, the concentrated waste liquid 36 raises in level and is discharged out an overflow outlet 60. The waste liquid 36 can now be treated further or disposed of. Also, the screw classifier 14 includes a screw lift 62 with threaded screw 64 and screw handle 66. The screw lift 62 is used for raising the screw conveyor 46 upwardly into a horizontal position for cleaning the bottom of the housing 42 and using a lower drain valve 68, or other maintenance purposes. A portion of the raised screw conveyor 46 is shown in this drawing.

In FIG. 2, a top view of the hydro-cyclone assembly 12 is illustrated disposed above the screw conveyor 46. In this drawing, the waste water and sewage 18 is shown entering the waste water inlet 16 in the upper portion of the assembly 12. Also the wash water with the organic waste or treated water 22 is shown exiting the treated water outlet 20 in the top of the assembly 12. Further, the top of the wash water inlet 24 is shown for receiving the high pressure water 30 into the assembly for creating the high velocity, spin 34 inside the cyclone housing 32 and separating the fine grit from the putrescible organic waste 36 and the wash water.

In FIG. 3, an end view of the waste water system 10 is shown and illustrating the overflow outlet 60 and the drain valve 68 in the classifier housing 42. In FIG. 4, an opposite end view of the waste water system 10 is shown and illustrating the front of the hydro-cyclone assembly 12 with the waste water inlet 16 and the treated water outlet 20.

In the method of operation of the subject waste water system 10, the waste water and sewage 18 is received in the waste water inlet 16 in the hydro-cyclone 12, typically in a pressure range of 5 to 10 psi and typically at a volume in a range of 90 to 400 gpm. At the same time, the high pressure wash water 30, in a pressure range of 20 to 40 psi and at a volume of 10 to 50 gpm, is introduced tangentially into the side of the cyclone housing 32 for creating the spinning action and releasing the suspended inorganic grit from the organic waste in the wash water 18. At this time, the concentrated grit liquid 36 moves downwardly through the lower apex 38, through the cyclone discharge hose 40 or other means, and then dropping into the open top of the classifier housing 42.

Also, it should be mentioned that the cyclone is normally installed at any angle from and including horizontal to vertical. Preferably the large diameter end, or the overflow end, is located at a higher elevation the pointed or apex end, as shown in the drawings.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art. It should be noted that where the term "wash water" is used, it should be understood that the water may include chemicals, other fluids than water, entrained gas in the water or a gas without water.

The embodiments of the invention for which as exclusive privilege and property right is claimed are defined as follows:

1. A method for treating organic waste water and sewage and removing inorganic grit therefrom using a hydro-cyclone housing, the housing including a waste water and sewage inlet attached to an upstream portion of the housing, the housing including a wash water inlet attached to a downstream portion of the housing, the housing disposed at an angle from the horizontal, the steps comprising:

introducing waste water and sewage under pressure through the waste water and sewage inlet into the upstream portion of the housing and creating a vortex with a cyclone spin;

introducing high pressure wash water having a pressure greater than the pressure of the waste water and sewage through the wash water inlet and into the housing;

combining the waste water and sewage with the high pressure wash water in the housing and creating an enhanced vortex for removing fine putrescible material in the waste water and sewage, and creating a high velocity water spin;

throwing the inorganic grit in the high velocity water spin to an interior side of the housing by centrifugal force and separating the waste water and sewage and the wash water from the inorganic grit;

discharging the waste water and sewage and the wash water out a treated water outlet in a top portion of the housing for returning it to a water treatment plant for further processing; and discharging the separated inorganic grit, as a concentrated grit liquid, through an apex in a bottom portion of the housing.

2. The method as described in claim 1 wherein the pressure of the waste water and sewage is in a range of 5 to 10 psi.

3. The method as described in claim 1 wherein the pressure of the high pressure wash water is in a range of 20 to 40 psi.

4. The method as described in claim 1 wherein the volume of the waste water and sewage is in a range of 90 to 400 gpm.

5. The method as described in claim 1 wherein the volume of the wash water is in a range of 10 to 50 gpm.

6. The method as described in claim 1 wherein the separated inorganic grit in the concentrated liquid is discharged from the housing into an open top or opening in a top of a screw classifier.

7. The method as described in claim 1 wherein a gas is introduced into the high pressure wash water, through the wash water inlet, and into the housing, a mixture of the high pressure wash water and gas enhancing the separation of the waste water and sewage and the wash water and gas from the inorganic grit.

8. A method for treating organic waste water and sewage and removing inorganic grit therefrom using a hydro-cyclone housing, the housing including a waste water and sewage inlet attached to an upstream portion of the housing, the housing including a wash water inlet attached to a downstream portion of the housing, the housing disposed at an angle from the horizontal, the steps comprising:

introducing waste water and sewage under pressure through the waste water and sewage inlet into the upstream portion of the housing and creating a vortex with a cyclone spin;

introducing high pressure wash water with a gas having a pressure greater than the pressure of the waste water and sewage through the wash water inlet and into the housing;

combining the waste water and sewage with the high pressure wash water and gas in the housing and creating an enhanced vortex for removing fine putrescible material in the waste water and sewage, and creating a high velocity water spin;

throwing the inorganic grit in the high velocity water spin to an interior side of the housing by centrifugal force and separating the waste water and sewage and the wash water and gas from the inorganic grit;

discharging the waste water and sewage and the wash water and gas out a treated water outlet in a top portion of the housing for returning it to a water treatment plant for further processing; and discharging the separated inorganic grit, as a concentrated grit liquid, through an apex in a bottom portion of the housing.

9. The method as described in claim 8 wherein the pressure of the waste water and sewage is in a range of 5 to 10 psi.

10. The method as described in claim 8 wherein the pressure of the high pressure wash water and gas is in a range of 20 to 40 psi.

11. The method as described in claim 8 wherein the volume of the waste water and sewage is in a range of 90 to 400 gpm.

12. The method as described in claim 8 wherein the volume of the wash water and gas is in a range of 10 to 50 gpm.

13. The method as described in claim 8 wherein the separated inorganic grit in the concentrated liquid is discharged from the housing into an open top or opening in a top of a screw classifier.

14. A method for treating organic waste water and sewage and removing inorganic grit therefrom using a hydro-cyclone housing, the housing including a waste water and sewage inlet attached to an upstream portion of the housing, the housing including a wash water inlet attached to a downstream portion of the housing, the housing disposed at an angle from the horizontal, the steps comprising:

introducing waste water and sewage under pressure in a range of 5 to 10 psi and a volume in a range of 90 to 400 gpm through the waste water and sewage inlet into the upstream portion of the housing and creating a vortex with a cyclone spin;

introducing high pressure wash water under pressure in a range of 20 to 40 psi and a volume in a range of 10 to 50 gpm through the wash water inlet and into the housing;

combining the waste water and sewage with the high pressure wash water in the housing and creating an enhanced vortex for removing fine putrescible material in the waste water and sewage, and creating a high velocity water spin;

throwing the inorganic grit in the high velocity water spin to an interior side of the housing by centrifugal force and separating the waste water and sewage and the wash water from the inorganic grit;

discharging the waste water and sewage and the wash water out a treated water outlet in a top portion of the housing for returning it to a water treatment plant for further processing; and discharging the separated inorganic grit, as a concentrated grit liquid, through an apex in a bottom portion of the housing.

15. The method as described in claim 14 wherein the separated inorganic grit in the concentrated liquid is discharged from the housing into an open top or opening in a top of a screw classifier.

16. The method as described in claim 14 wherein a gas is introduced into the high pressure wash water, through the wash water inlet, and into the housing, a mixture of the high pressure wash water and gas enhancing the separation of the waste water and sewage and the wash water and gas from the inorganic grit.

\* \* \* \* \*